(12) United States Patent
Park et al.

(10) Patent No.: US 10,873,959 B2
(45) Date of Patent: Dec. 22, 2020

(54) METHOD AND DEVICE FOR PROVIDING SERVICE IN WIRELESS COMMUNICATION SYSTEM

(71) Applicant: Samsung Electronics Co., Ltd., Suwon-si (KR)

(72) Inventors: Jungshin Park, Suwon-si (KR); Joohyung Lee, Gwacheon-si (KR); Kisuk Kweon, Suwon-si (KR); Sangjun Moon, Seoul (KR); Jicheol Lee, Suwon-si (KR); Beomsik Bae, Seongnam-si (KR); Daegyun Kim, Seongnam-si (KR); Jinsung Lee, Suwon-si (KR); Hyungho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/343,897

(22) PCT Filed: Oct. 31, 2017

(86) PCT No.: PCT/KR2017/012174
§ 371 (c)(1),
(2) Date: Apr. 22, 2019

(87) PCT Pub. No.: WO2018/084539
PCT Pub. Date: May 11, 2018

(65) Prior Publication Data
US 2020/0059945 A1 Feb. 20, 2020

(30) Foreign Application Priority Data
Nov. 1, 2016 (KR) .................. 10-2016-0144210

(51) Int. Cl.
*H04W 72/12* (2009.01)
*H04W 4/029* (2018.01)
(Continued)

(52) U.S. Cl.
CPC ....... *H04W 72/1242* (2013.01); *H04W 4/029* (2018.02); *H04W 68/005* (2013.01); *H04W 68/12* (2013.01)

(58) Field of Classification Search
CPC ............ H04W 72/1242; H04W 4/029; H04W 68/005; H04W 68/12; H04W 48/16; H04W 68/02; H04W 72/12; H04W 88/06
See application file for complete search history.

(56) References Cited

U.S. PATENT DOCUMENTS

2013/0053031 A1 2/2013 Widjaja et al.
2014/0256318 A1 9/2014 Ekici et al.
(Continued)

FOREIGN PATENT DOCUMENTS

KR 10-2008-0095026 A 10/2008
KR 10-2014-0036901 A 3/2014
(Continued)

OTHER PUBLICATIONS

Huawei: "Discussion on the CLI for CS fallback", 3GPP Draft; C4-082700 DISC CLI CSFB VI, 3rd Generation Partnership Project (3GPP), No. Phoenix; Oct. 13, 2008, Oct. 13, 2008 (Oct. 13, 2008), XP050313475.*
(Continued)

*Primary Examiner* — Jay Y Lee
(74) *Attorney, Agent, or Firm* — Jefferson IP Law, LLP

(57) ABSTRACT

The present disclosure relates to a communication technique for fusing, with an IoT technology, a 5G communication system for supporting a higher data transmission rate than a 4G system, and a system therefor. The present disclosure
(Continued)

may be applied to intelligent services, such as smart homes, smart buildings, smart cities, smart cars or connected cars, health care, digital education, retail businesses, and security and safety related services, on the basis of 5G communication technologies and IoT-related technologies. The present invention, according to one embodiment, may provide a method for requesting a service by a terminal, the method comprising the steps of: receiving, from a first network core, information for instructing a second network priority traffic; on the basis of the information for instructing the second network priority traffic, searching for a cell of a second network; and, if a cell accessible to the second network exists, transmitting a service request to the second network.

15 Claims, 12 Drawing Sheets

(51) Int. Cl.
*H04W 68/00* (2009.01)
*H04W 68/12* (2009.01)

(56) References Cited

U.S. PATENT DOCUMENTS

| | | |
|---|---|---|
| 2016/0057729 A1 | 2/2016 | Horn et al. |
| 2016/0353361 A1 | 12/2016 | Jung et al. |
| 2017/0048739 A1 | 2/2017 | Jeong et al. |
| 2017/0353914 A1 | 12/2017 | Jung et al. |
| 2019/0239271 A1* | 8/2019 | Guerzoni ............. H04W 76/16 |

FOREIGN PATENT DOCUMENTS

| | | |
|---|---|---|
| KR | 10-20150123747 A | 11/2015 |
| KR | 10-2016-0073227 A | 6/2016 |
| WO | 2015/119472 A1 | 8/2015 |

OTHER PUBLICATIONS

Texas Instruments Inc: "RRC enhancements to support CS Fallback for MT calls", 3GPP Draft; R2-081554, 3rd Generation Partnership Project (3GPP), vol. RAN WG2, No. Shenzhen, China 20080321, Mar. 21 >008 (Mar. 21, 2008), XP050139290.*

"3rd Generation Partnership Project; Technical Specification Group Services and System Aspects; Circuit Switched (CS) fallback in Evolved Packet System (EPS); Stage 2 (Release 13)", 3GPP Standard; Technical Specification; 3GPP TS 23.272, 3rd Generation Partnership Project (3GPP), Mobile Competence Centre; 650, Route Des Lucioles; F-06921 Sophia-Antipolis Cedex; France, vol. SA WG2, No. V13.4.0, Jun. 22, 2016 (Jun. 22, 2016), pp. 1-103, XP051295178, [retrieved on Jun. 22, 2016].

European Extended Search Report dated Jul. 15, 2019, issued in European Application No. 17867200.2-1214 / 3522627.

Huawei: "Discussion on the CLI for CC fallback", 3GPP Draft; C4-082700_DISC CLI CSFB V1, 3rd Generation Partnership Project (3GPP), No. Phoenix; Oct. 13, 2008, Oct. 13, 2008 (Oct. 13, 2008), KP050313475.

Texas Instruments Inc: "RRC enhancements to support CS Fallback for MT calls", 3GPP Draft; R2-081554, 3rd Generation Partnership Project (3GPP), vol. RAN WG2, No. Shenzhen, China 20080321, Mar. 21, 2008 (Mar. 21, 2008), XP050139290.

European Office Action dated Oct. 14, 2020, issued in European Application No. 17867200.2.

* cited by examiner

METHOD AND DEVICE FOR PROVIDING SERVICE IN WIRELESS COMMUNICATION SYSTEM

TECHNICAL FIELD

The disclosure relates to a method and apparatus for receiving traffic in a wireless communication system. In addition, the disclosure relates to an interworking structure between a first network and a second network and to a communication service using the interworking structure.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

Accordingly, the disclosure is to provide a method for delivering an improved service in a wireless communication system. In addition, the disclosure is to provide a new structure that enables a first network to interwork with a second network in a wireless communication system.

Solution to Problem

According to an embodiment of the disclosure, there is provided a method for a terminal to request a service. The method may include: receiving information indicating second network priority traffic from the first network core; searching for a cell of a second network based on the information indicating second network priority traffic; and transmitting a service request to the second network if there is a cell connectable to the second network.

According to an embodiment of the disclosure, there is provided a method for a first network core to provide a service. The method may include: receiving a traffic indicator indicating that there is second network priority traffic from the core of a second network; transmitting information indicating second network priority traffic to a terminal; and receiving a service request or information indicating that the terminal has transmitted a service request to the second network according to a cell search result of the terminal.

According to an embodiment of the disclosure, there is provided a method for a second network core to provide a service. The method may include: determining whether traffic destined for a terminal is second network priority traffic; transmitting a traffic indicator indicating that the traffic destined for the terminal is second network priority traffic to the core of a first network based on a determination that the traffic destined for the terminal is second network priority traffic; and receiving a service request from the terminal through the second network.

According to an embodiment of the disclosure, there is provided a terminal. The terminal may include: a transceiver configured to transmit and receive signals; and a controller configured to control receiving information indicating second network priority traffic from a first network core, searching for a cell of a second network based on the information indicating second network priority traffic, and transmitting a service request to the second network if there is a cell connectable to the second network.

According to an embodiment of the disclosure, there is provided a first network core. The core of the first network may include: a transceiver configured to transmit and receive signals; and a controller configured to control receiving a traffic indicator indicating that there is second network priority traffic from the core of a second network, transmitting information indicating second network priority traffic to a terminal, and receiving a service request or information indicating that the terminal has transmitted a service request to the second network according to a cell search result of the terminal.

According to an embodiment of the disclosure, there is provided a first network core. The core of the first network may include: a transceiver configured to transmit and receive signals; and a controller configured to control receiving a traffic indicator indicating that there is second network priority traffic from the core of a second network, transmitting information indicating second network priority traffic to a terminal, and receiving a service request or information indicating that the terminal has transmitted a service request to the second network according to a cell search result of the terminal.

Aspects, features or objects of the disclosure are not limited to those described above. Other aspects and salient features of the disclosure will become apparent to those skilled in the art from the following description.

Advantageous Effects of Invention

According to an embodiment of the disclosure, there are provided a method and apparatus for receiving traffic in a wireless communication system. According to another embodiment of the disclosure, there are provided a structure for interworking between a first network and a second network and a communication service using the interworking structure.

According to an embodiment of the disclosure, it is possible to reduce power consumption of the terminal by providing a method of paging the second network through a reliable path of the first network.

According to an embodiment of the disclosure, it is possible to reduce the load on the core network and improve the efficiency by eliminating or reducing the tracking area management function of the core network entity of the second network.

According to an embodiment of the disclosure, through the selective transmission of a scheduling request (SR) of the terminal, it is possible to reduce delay and service interruption due to handover failure in CS fallback.

MODE FOR THE INVENTION

Figure 1:
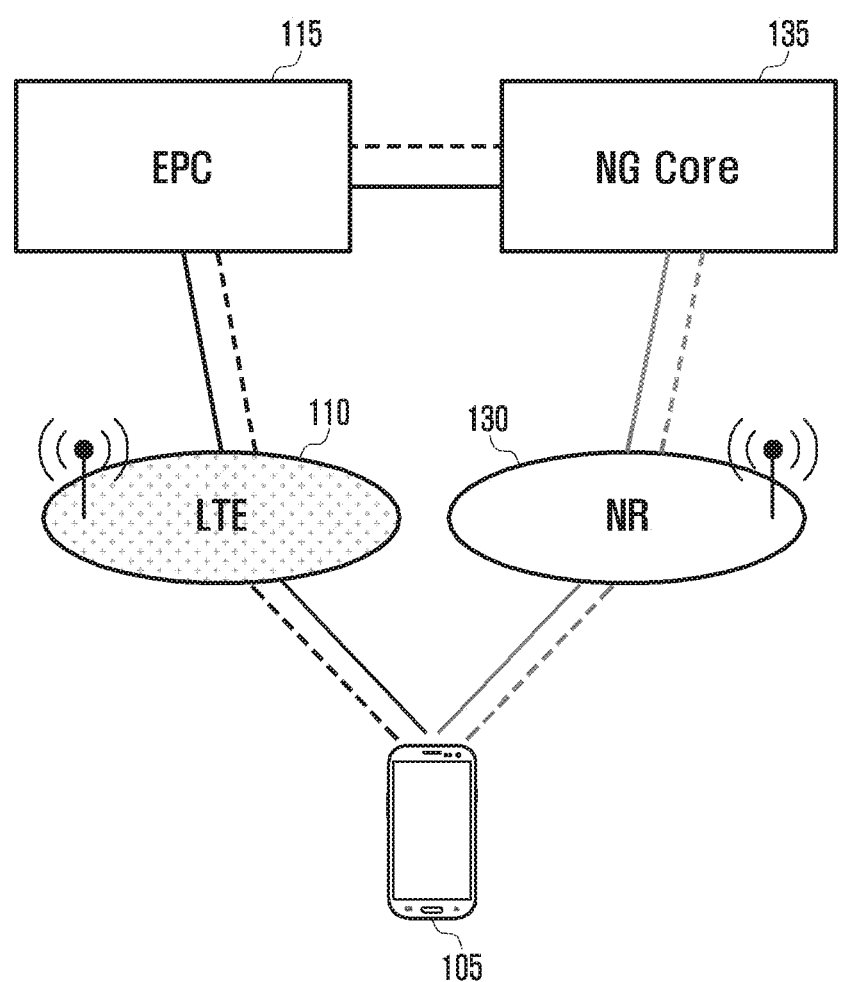
FIG. 1 depicts core network interworking according to an embodiment of the disclosure.

Hereinafter, various embodiments of the disclosure are described in detail with reference to the accompanying drawings. The same or similar reference symbols are used throughout the drawings to refer to the same or like parts. Descriptions of functions and structures well known in the art may be omitted for clarity and conciseness without obscuring the subject matter of the disclosure.

In one embodiment of the disclosure, fourth generation (4G) mobile communication may include long term evolution (LTE), LTE-advanced (LTE-A), WiBro, and other evolved 3G networks (e.g., HSPA+).

In one embodiment of the disclosure, fifth generation (5G) mobile communication is communication using an extremely high frequency band (e.g., 28 GHz) unlike the LTE system using a frequency band of 3 GHz or less. Compared with communication using a lower frequency band such as 4G communication, communication using an extremely high frequency band has a disadvantage in that strong line-of-sight propagation is required and the propagation distance is short, but has an advantage in that communication speed is fast.

In one embodiment of the disclosure, the first network and the second network may be networks using different mobile communication systems. For example, the first network may be a network using 4G mobile communication, and the second network may be a network using 5G mobile communication. Although the first network is described as using 4G mobile communication and the second network is described as using 5G mobile communication, the disclosure is not limited thereto. For example, the first network may use non-4G mobile communication, and the second network may use non-5G mobile communication. In the description, when the first network and the second network are used together, it is assumed that the first network and the second network use different mobile communications. In addition, the second network may be a mobile communication system using a higher frequency compared with the first network.

Transmission or reception using the first network refers to transmission or reception using the base station and network core of the first network. Transmission or reception using the second network refers to transmission or reception using the base station and network core of the second network.

The network operator intends to build a mobile communication network using extremely high frequencies (e.g., 5G standalone system) as a new communication network, and this new communication network will coexist with an existing mobile communication network such as a 4G mobile network. In particular, the extremely high frequency band or mmWave band may be vulnerable to path loss due to line-of-sight propagation while providing a high-speed broadband service, and thus is expected to have small coverage with limited mobility support. Accordingly, an embodiment of the disclosure is to provide a method for efficiently providing a second network service through interworking between the first network capable of readily supporting mobility and the second network using an extremely high frequency band. Here, the interworking may indicate core-level interworking. In one embodiment, the stability of service can be enhanced based on the coverage support of the first network.

FIG. 1 depicts core network interworking according to an embodiment of the disclosure. In FIG. 1, it is assumed that the first network is an LTE network and the second network is a 5G network.

FIG. 1 shows a terminal 105, a cell 110 of the LTE base station, an evolved packet core (EPC) 115 representing the core of a 4G network, a cell 130 of the 5G base station (new radio (NR)), and a next generation (NG) core 135 representing the core of a 5G network. In the structure of FIG. 1, the LTE cell 110 and the NR cell 130 are not directly connected to each other, but the EPC 115 and the NG core 135 are connected to each other so as to transmit and receive signals, information, and messages. This corresponds to core network interworking.

The 4G-5G structure for core-level interworking shown in FIG. 1 can readily support the 5G standalone services and can eliminate interworking between base stations. In addition, through the core-level interworking structure, the coverage limitation due to small 5G coverage can be compensated by 4G coverage.

In this structure, the terminal can attach to and detach from the 4G and 5G networks respectively through non-access stratum (NAS) signaling (core signaling), and can support 4G or 5G priority traffic in the appropriate network by using the NG core as an IP mobility anchor point.

Meanwhile, in the structure shown in FIG. 1, as the terminal performs mobility management and session management procedures respectively for the 4G and 5G networks, the terminal may have to doubly perform operations such as tracking area update and paging message reception for the 4G and 5G networks in the idle mode. This can increase signal processing complexity and power consumption of the terminal equipped with a 4G/5G modem. To solve this problem, it is possible to propose a method of performing mobility management and session management for different networks in an integrated manner.

Figure 2:
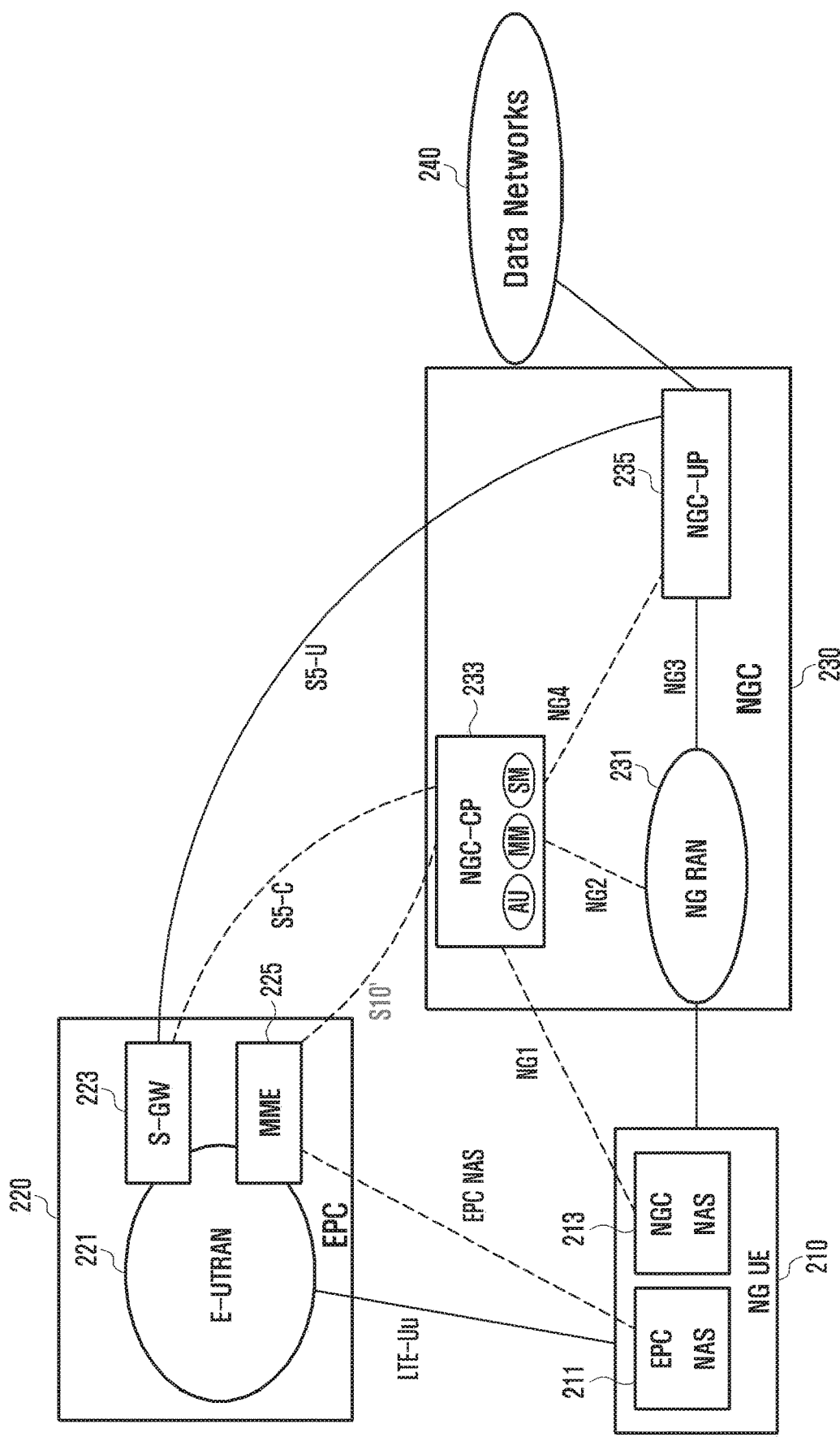
FIG. 2 depicts a network architecture where a first network and a second network coexist according to an embodiment of the disclosure.

FIG. 2 depicts a network architecture where a first network and a second network coexist according to an embodiment of the disclosure. In FIG. 2, it is assumed that the first network is an LTE network and the second network is a 5G network.

With reference to FIG. 2, the terminal 210 may include an EPC NAS 211 and an NGC (next generation core) NAS 213. The EPC NAS 210 is used for connection with the MME (mobility management entity) 225 of the EPC 220, and the NGC NAS 215 is used for connection with the CP (control plane) 233 of the NGC 230. The EPC 220 may include the E-UTRAN 221, the S-GW (serving gateway) 223 and the MME 225, and the NGC 230 may include the NG RAN 231, the NGC CP 233, and the NGC UP (user plane) 235. The NGC UP 235 may be connected with an external data network 240.

In the architecture of FIG. 2, the terminal 210 has NAS connections to the 5G core network NGC 230 and the 4G core network EPC, respectively. The terminal 210 can support both single and dual connectivity to the 4G and 5G networks, the NGC 230 supports the legacy interface of the EPC 220 as much as possible, and the modification of the existing MME is minimized. The IP mobility anchor is located at the NGC 230 and traffic is supported via single-point anchoring. Through the above structure, it is possible to minimize the influence of interworking between the EPC and the NGC, and to support service continuity with a single anchor point.

On the other hand, as described above, if the terminal in the idle mode performs the paging and TAU procedures respectively with the 4G network and the 5G network, the complexity and power consumption of the terminal increase. Hence, a method is needed to reduce the complexity and power consumption of the terminal.

In one embodiment of the disclosure, a method is proposed for receiving a paging message through one of the first network and the second network in accordance with the above-described requirement. Because performing paging and location update for both the first network and the second network increases the complexity of the terminal, it may be considered to receive a paging message from one of the at least two networks.

For example, a paging message can be transmitted through the first network instead of the second network even when traffic transmission through the second network is required in the idle mode. Upon receiving the paging message, the terminal can transmit a service request through the first network. Upon receiving the service request, the core network node of the first network may trigger the handover of the terminal to the second network.

Through the above-described scheme, the paging message is transmitted only through the first network (single path), thereby reducing the complexity of the terminal compared with receiving the paging message through the second network. In addition, signaling for the second network can be reduced by transmitting the TAU over the first network. As described above, the paging message can be received by using one of multiple networks, thereby reducing the complexity of the terminal.

In the above embodiment, signaling of the terminal for the second network can be reduced by transmitting the paging and TAU messages for the second network through the first network, but the complexity of the core network nodes may increase because the signal between the core network node of the first network and the core network node of the second network increases. In addition, if the first network receiving the paging message triggers the handover to the second network but the terminal fails to handover to the second network, the terminal may have to return to the first network after the handover failure. This can be a serious delay. Particularly, if the second network is a 5G network, the cells of the 5G network may be mainly small cells, and thus there is a high possibility that a delay occurs due to a handover failure after a handover trigger.

In the following description, a new embodiment is proposed that can reduce the complexity of the terminal, reduce the complexity between the core networks, and resolve the delay problem.

In the embodiment, the terminal may receive a paging message through the first network among the first network and the second network, and then selectively transmit a service request to the selected one of the first network and the second network. As the paging message is received through one network, the complexity of the terminal for receiving the paging message can be reduced. Additionally, as the terminal having received the paging message selectively transmits the service request to the network to which the terminal can connect, the delay problem due to the connection failure or handover failure can be resolved.

A new mode can be defined for the embodiment below. The new mode can be referred to as the first network assisted idle mode. In the first network assisted idle mode, the paging message for the second network or the second network priority traffic information is transmitted through the first network. The first network assisted idle mode may be set by the user, may be set according to an indication from the base station or network core, or may be set when a preset power reference or the like is satisfied. When the first network assisted idle mode is not set, the terminal can establish separate NAS connections with both the first network and the second network and receive paging messages. In the first network assisted idle mode, the terminal may receive a paging message for the second network through the first network as in the following embodiments. Also, in the first network assisted idle mode, the terminal does not perform the TAU procedure. The TAU procedure for the second network is not mandatory because the terminal directly performs a cell search and transmits a service request to the cell to connect.

Meanwhile, the default idle mode for the terminal supporting the first network and the second network may be the first network assisted idle mode. In this case, the terminal supporting the first network and the second network can receive by default a paging message for the second network through the first network, and it can selectively transmit the service request.

On the other hand, if the terminal does not perform the TAU procedure with the second network, context management of the terminal may be a problem in the second network core. For example, if the terminal is not served by the second network core, the context of the terminal needs to be deleted. However, as the terminal does not perform the TAU procedure, it may be unable to delete the context even in a special situation (e.g., the terminal is suddenly powered off or falls in the shadow area). Hence, if traffic for the terminal does not occur for a preset time, the second network core or the control plane entity thereof can cancel the registration of the terminal and delete the context. In addition, as the terminal does not perform the TAU procedure with the second network but can perform the TAU procedure with the first network, the second network core can receive the TAU information of the terminal from the first network and can delete the context based on a determination that context management for the terminal is not necessary.

Figure 3:
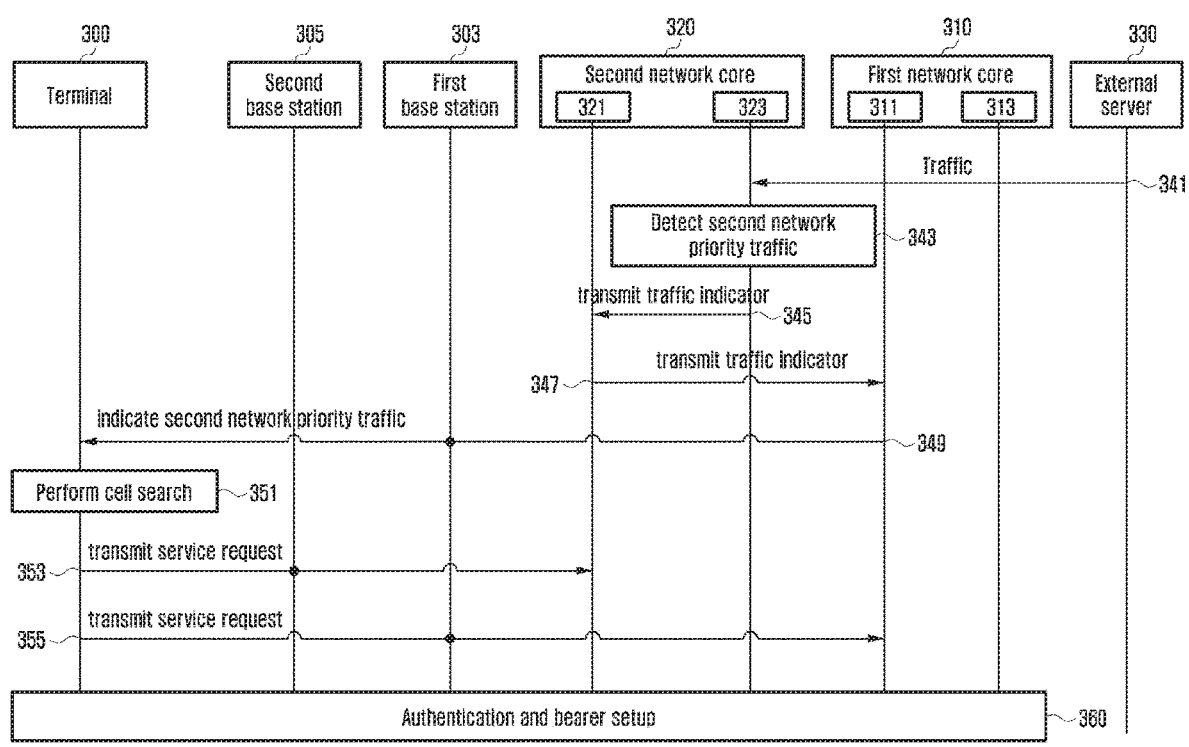
FIG. 3 depicts an interworking method according to an embodiment of the disclosure.

FIG. 3 depicts an interworking method according to an embodiment of the disclosure.

With reference to FIG. 3, the network system may include a terminal 300, a first base station 303, a second base station 305, a first network core 310, a second network core 320, and an external server 330. For example, the first network may be a 4G network and the second network may be a 5G network.

The terminal 300 may include a modem connectable to both the first network and the second network and may perform mobile communication using the first network and/or the second network. The first network core 310 may include a first control plane entity 311 and a first user plane entity 313. The first control plane entity 311 manages control signals and the first user plane entity 313 manages data and traffic. If the first network is an LTE network, the first network core 310 may be the EPC, the first control plane entity 311 may be the MME, and the first user plane entity 313 may be the S-GW. The operation of the first control plane entity 311 and the first user plane entity 313 may be regarded as the operation of the first network core 310.

The second network core 320 may include a second control plane entity 321 and a second user plane entity 323. The second control plane entity 321 manages control signals and the second user plane entity 323 manages data and traffic. If the second network is a 5G network, the second network core 320 may be the NGC, the second control plane entity 321 may be the NGC CP, and the second user plane entity 323 may be the NGC UP. The operation of the second control plane entity 321 and the second user plane entity 323 may be regarded as the operation of the second network core 320. The second network core 320 or the second user plane entity 323 may determine whether data or traffic received from the external server 330 is second network priority traffic and may notify the first network of the determination result.

At operation 341, the second network core 320 may receive traffic destined for the terminal 300. The second user plane entity 323 of the second network core 320 may receive the traffic.

Upon detecting the traffic, at operation 343, the second user plane entity 323 may determine whether the traffic is second network priority traffic. The second user plane entity 323 can identify whether the traffic is second network priority traffic based on information contained in the traffic or information received together with the traffic. The second network priority traffic may also be referred to as second network preference traffic.

If the traffic is not second network priority traffic, the traffic can be determined as first network priority traffic. The second network priority traffic may be second network dedicated traffic or traffic whose transmission through the second network takes priority over transmission through the first network. The second network dedicated traffic can be transmitted only through the second network. The second network priority traffic other than the second network dedicated traffic may be provided first through the second network if transmission through the second network is possible or may be provided through the first network if transmission through the second network is not possible.

In the case of second network priority traffic, the second user plane entity 323 may send a traffic indicator to the second control plane entity 321. The traffic indicator may indicate whether the traffic is second network priority traffic. For example, the following schemes are possible. A traffic indicator may be transmitted to indicate whether the traffic is second network priority traffic. A normal traffic indicator may be sent from the second network core to the first control plane entity 311. The information indicating second network priority traffic may be marked in the packet. The information indicating second network priority traffic may be marked in the null packet. If the traffic indicator is transmitted as a marking in the packet, the traffic indicator may be transmitted from the second user plane entity 323 to the first user plane entity 313. When the traffic indicator is sent to the first user plane entity 313, the first user plane entity 313 may deliver the traffic indicator to the first control plane entity 311 inside the first network core 310. In this way, it is possible to indicate whether traffic destined for the terminal 300 is second network priority traffic.

At operation 347, the second control plane entity 321 may send a traffic indicator to the first control plane entity 311. The traffic indicator may indicate whether the traffic is second network priority traffic.

At operation 349, the first network core 310 or the first control plane entity 311 may transmit information indicating second network priority traffic to the terminal 300. This information may be transmitted via the first base station 303. The second network priority traffic may be indicated in various ways. When the terminal 300 is in the first network active mode, a second network priority traffic indicator may be sent. When the terminal is in the first network idle mode (standby mode), information indicating second network priority traffic may be sent together with the paging message. The paging message may include an indicator of second network priority traffic and may indicate that the paging purpose is traffic reception through the second network.

Upon receiving the information indicating second network priority traffic, at operation 351, the terminal 300 may perform a cell search. As the terminal has received information indicating second network priority traffic, it can search for a cell connectable to the second network.

If there is a cell connectable to the second network as a result of the cell search, at operation 353, the terminal 300 can transmit a service request to the second network core 320. The service request may be sent via the second base station 305.

Meanwhile, the second network core 320 may send an indication of service request reception to the first network core 310. This is because the first core network core 310 may continue to send a paging message or second network priority traffic indication to the terminal 300 if such an indication is not transmitted. Upon receiving the indicator from the second network core 320, the first network core 310 may discontinue transmitting a paging message or second network priority traffic indication to the terminal 300. Alternatively, the terminal 300 may send the first network core 310 a message indicating transmission of a service request to the second network core. In this case, a new NAS message can be used. Upon receiving the message, the first network core 310 may discontinue transmitting a paging message or second network priority traffic indication to the terminal 300. Additionally, the first network may be configured to repeat transmission of a paging message or second network priority traffic indication to the terminal 300 only for a preset number of times or a preset time. If a service request is not received from the terminal 300 for the preset number of times or the preset time, or if a message indicating transmission of a service request to the second network is not received from the second network core 320 or the terminal 300 for the preset number of times or the preset time, the first network core 310 may discontinue transmitting a paging message or second network priority traffic indication to the terminal 300.

If there is no cell connectable to the second network at operation 351, at operation 355, the terminal 300 can transmit a service request to the first network core 310. The terminal 300 may transmit the service request to the first network core 310 via the second base station. If the traffic for the terminal 300 is second network dedicated traffic that cannot be received through the first network, the terminal 300 may not transmit the service request to the first network core 310 at operation 353 because it cannot receive the traffic through the first network.

At operation 360, the terminal and the first network core 310 or the second network core 320 may perform authentication and bearer setup. After completion of authentication and bearer setup, traffic can be received via the established bearer.

As described above, the terminal 300 can dynamically select a network and receive traffic through the selected network. In the above embodiment, the terminal receives a second network priority traffic indication or a paging message through the first network 310, reducing the complexity of the terminal. In other words, the terminal receives a paging message and information indicating second network priority traffic through a reliable path of the first network, and thus the terminal receives a paging message only for the first network, thereby saving power at the terminal level.

In addition, the signaling overhead of the network node can be reduced because the terminal selectively transmits a service request to a connectable cell after the cell search. As the terminal transmits a service request directly to the second network according to the cell search result, the TAU for the second network is not necessary, reducing the complexity of the terminal. Also, as the terminal transmits a service request to a connectable network after a cell search, delay due to connection failure or handover failure can be prevented.

Figure 4:
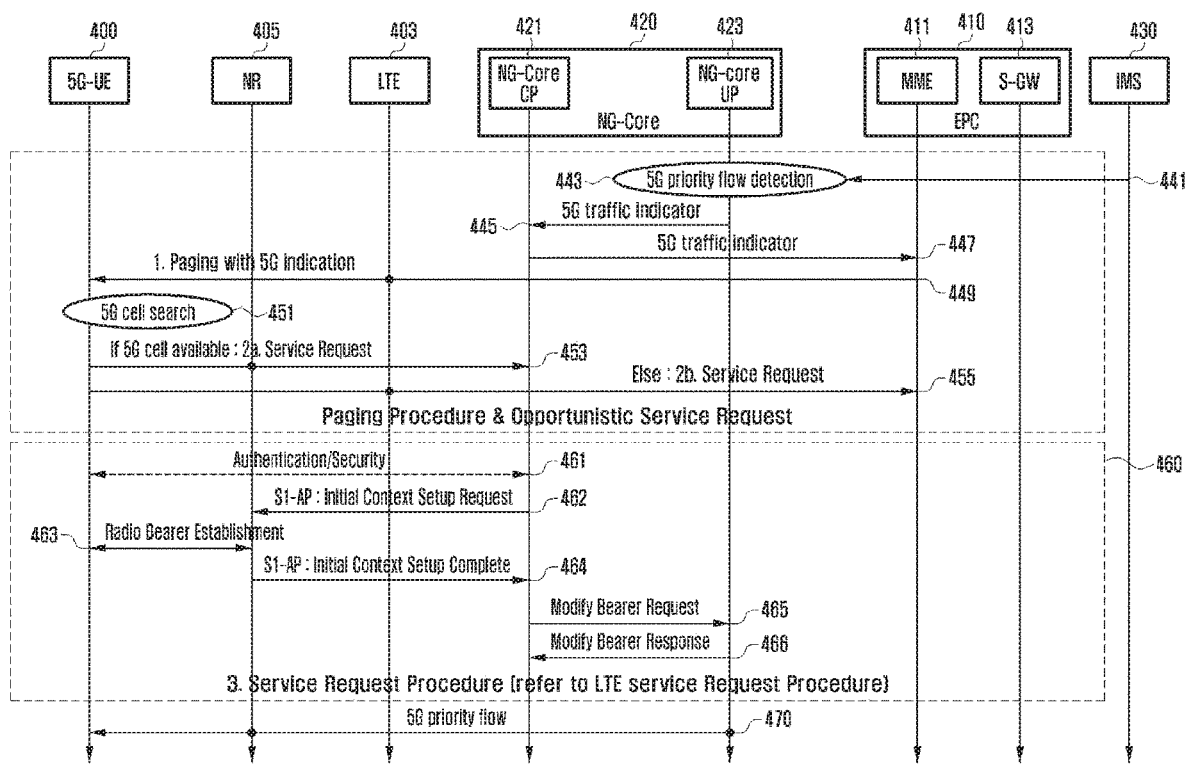
FIG. 4 shows signal flows in the embodiment of FIG. 3 when the terminal is in the idle mode, the first network is an LTE network, and the second network is a 5G network.

FIG. 4 shows signal flows in the embodiment of FIG. 3 when the terminal is in the idle mode, the first network is an LTE network, and the second network is a 5G network.

The 5G-UE 400 is a terminal supporting 5G communication and LTE communication, the NR 405 is a 5G base station, the eNB 403 is an LTE base station, the EPC 410 is the LTE network core, the MME 411 is a control plane entity of LTE, and the S-GW is a user plane entity of LTE. The NG core 420 is the 5G network core, the NG core CP 421 is a 5G control plane entity, and the NG core UP 423 is a 5G user plane entity. The server 430 corresponds to the external server 330 of FIG. 3.

The messages in FIG. 4 correspond to the messages in FIG. 3, and the operation of each entity in FIG. 4 corresponds to the operation of each entity in FIG. 3. Hence, refer to the description of FIG. 3 for the message contents and entity operations.

At operation 441, the NGC UP 423 may receive traffic. Here, the flow corresponds to traffic. At operation 443, the NGC UP 423 may determine whether the traffic is 5G priority traffic. In the case of 5G priority traffic, at operation 445, the NGC UP 423 may transmit a 5G traffic indicator to the NGC CP 421. The 5G traffic indicator indicates that the traffic destined for the terminal 400 is 5G priority traffic. (traffic indicator, 5G packet forwarding with marking, and null packet forwarding with marking may be used, refer to FIG. 3 for details). If the traffic indication is a traffic indicator, it can be transmitted to the MME 411 via the NGC CP 421; and if the traffic indication uses 5G packet forwarding with marking or null packet forwarding with marking, it can be sent directly to the S-GW 413.

At operation 447, the NGC CP 421 forwards the 5G traffic indicator to the MME 411.

At operation 449, the MME 411 transmits a 5G indication to the terminal 400. The 5G indication indicates that the traffic to be transmitted to the terminal 400 is 5G priority traffic. This indication may be transmitted together with a paging message or may be included in the paging message for transmission (paging with 5G indicator).

In the case of a paging message, it can be indicated using the CN domain field in paging information elements (IEs). The CN domain field is used to indicate the network where the paging has occurred. Hence, in the case of paging for the 5G network, the MME 411 may transmit a paging message whose CN domain field is set to "5G".

Alternatively, the terminal may be switched from the idle mode to the active mode through a paging message, and then a 5G service notification may be transmitted. An example of a 5G service notification is shown below.

| [5G service notification] | | |
|---|---|---|
| IE1 Information Element | Presence | 비고 |
| Protocol discriminator | M | |
| Security header type | M | |
| 5G service notification message identity | M | |
| Paging identity | M | UE paging identity |

Upon receiving the 5G indication, at operation 451, the terminal performs a cell search. The terminal can find a 5G cell or an LTE cell for receiving 5G traffic through the cell search. If there is a 5G cell capable of receiving the traffic as a result of the cell search, at operation 453, the terminal transmits a service request to the NGC CP 421. If there is no 5G cell capable of receiving the traffic, at operation 455, the terminal transmits a service request to the MME 411.

The procedure indicated by indicia 460 is a procedure for authentication, security and bearer setup for the 5G network.

At operation 461, the terminal 400 and the NGC CP 421 may perform authentication and security procedures. After completion of the authentication and security procedure, at operation 462, the NGC CP 421 may send an initial context setup request to the NR 405. At operation 463, the NR 405 and the terminal 400 establish a radio bearer. At operation 464, the NR 405 sends an initial context setup complete to the NGC CP 421. At operation 465, the NGC CP 421 transmits a modify bearer request to the NGC UP 423. At operation 466, the NGC UP 423 sends a modify bearer response to the NGC CP 421.

At operation 470, the terminal 400 receives 5G traffic.

As described above, the power of the terminal 400 can be saved because the paging for the 5G network is received through a reliable 4G path, and the delay due to handover failure or connection failure can be reduced because the terminal selectively transmits a service request.

Figure 5:
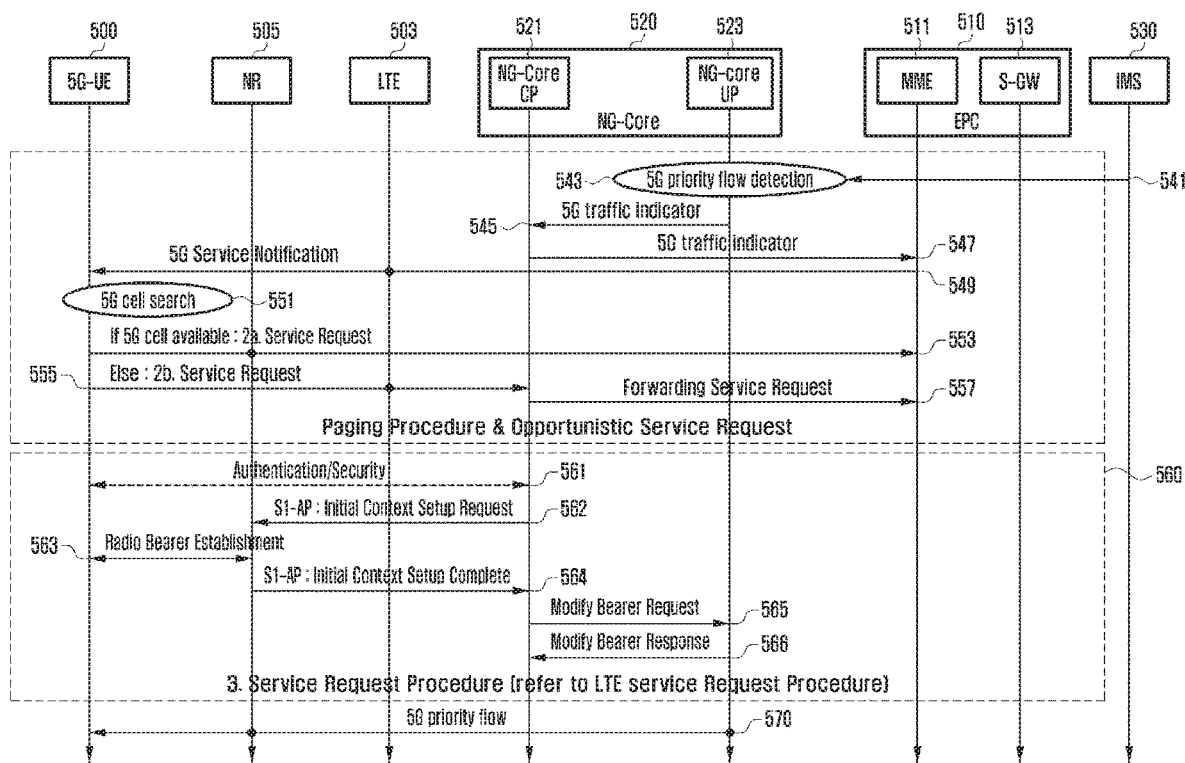
FIG. 5 shows signal flows in the embodiment of FIG. 3 when the terminal is in the active mode, the first network is an LTE network, and the second network is a 5G network.

FIG. 5 shows signal flows in the embodiment of FIG. 3 when the terminal is in the active mode, the first network is an LTE network, and the second network is a 5G network. The operation of each entity in FIG. 5 corresponds to the operation of each entity described in FIG. 4. In FIG. 5, the terminal 500 is in the active mode, and thus it does not have to receive a paging message. Compared with FIG. 4, the MME 511 can use a 5G service notification to transmit a 5G indication to the terminal 500 at operation 549. It is not necessary to use a paging message. Upon receiving the 5G indication at operation 549, the terminal performs a cell search at operation 551. The other operations correspond to those of FIG. 4.

Figure 6:
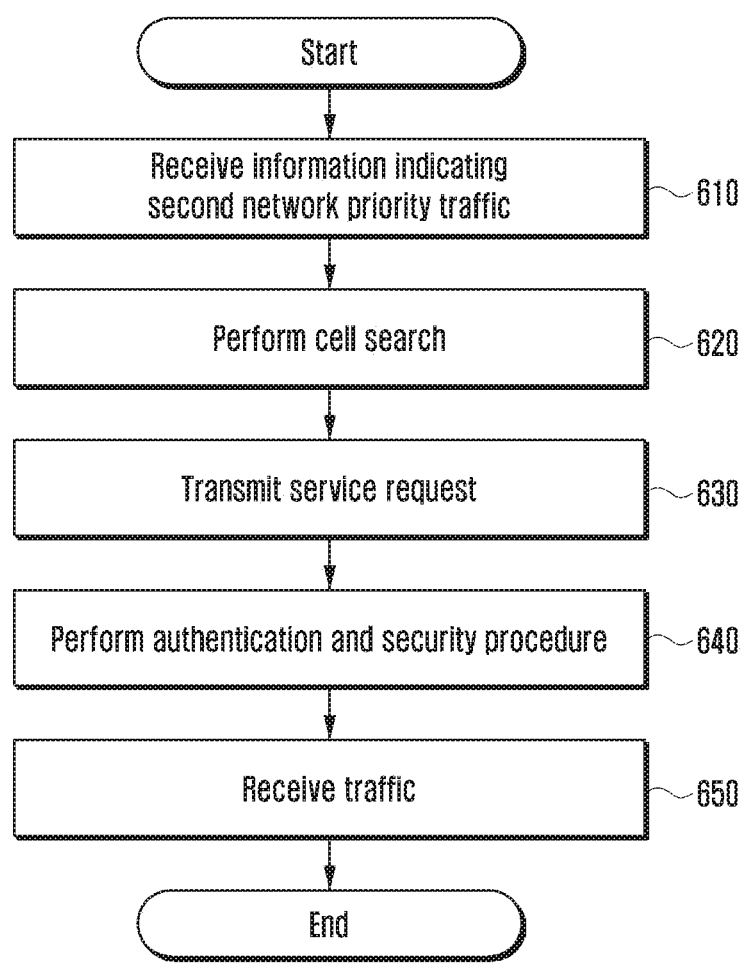
FIG. 6 illustrates operations of the terminal according to an embodiment of the disclosure.

FIG. 6 illustrates operations of the terminal according to an embodiment of the disclosure.

With reference to FIG. 6, at operation 901, the terminal may receive information indicating second network priority traffic from the first network core or the first control plane entity. This information may be transmitted via the first base station. The second network priority traffic may be indicated in various ways. When the terminal is in the first network active mode, it may receive a second network priority traffic indicator. For example, if the second network is a 5G network, the terminal may receive a 5G priority notification. When the terminal is in the first network idle mode, it may receive information indicating second network priority traffic together with a paging message. The paging message may include an indicator indicating second network priority traffic, and the paging purpose may indicate traffic reception through the second network. For example, if the second network is a 5G network, the terminal may receive paging with 5G priority notification.

At operation 620, the terminal may perform a cell search. After receiving the information indicating second network priority traffic, the terminal can search for a cell connectable to the second network. The terminal can also search for a cell connectable to the first network. As the cell search is performed after reception of the information indicating second network priority traffic, the terminal only needs to receive a paging message through the first network without the necessity for receiving a paging message or the like from the second network. In addition, as the service request will be transmitted after the cell search, the possibility of connection failure or handover failure after transmission of the service request is reduced.

At operation 630, the terminal transmits a service request. According to the cell search result, the service request can be transmitted to the first network or the second network. If there is a cell of the second network to which the terminal can connect, the terminal transmits a service request to the second network core. The terminal may transmit a service request to the base station of the second network, and the base station may forward the service request to the second network core.

If there is no connectable cell among the cells of the second network, the terminal can transmit a service request to the first network core. The terminal may transmit a service request to the base station of the first network, and the base station may forward the service request to the first network core. If the traffic is second network dedicated traffic and there is no connectable cell of the second network, the terminal may terminate the procedure without sending a service request to the first network.

At operation 640, the terminal may perform the authentication and security procedure with the network to which the service request has been sent. After the authentication and security procedure, a bearer for the terminal to receive traffic can be established.

At operation 650, the terminal may receive traffic through the established bearer.

Meanwhile, the operation method of the terminal is not limited to the embodiment of FIG. 6, and the terminal can perform all of the operations of the terminal described with reference to FIGS. 1 to 5.

Figure 7:
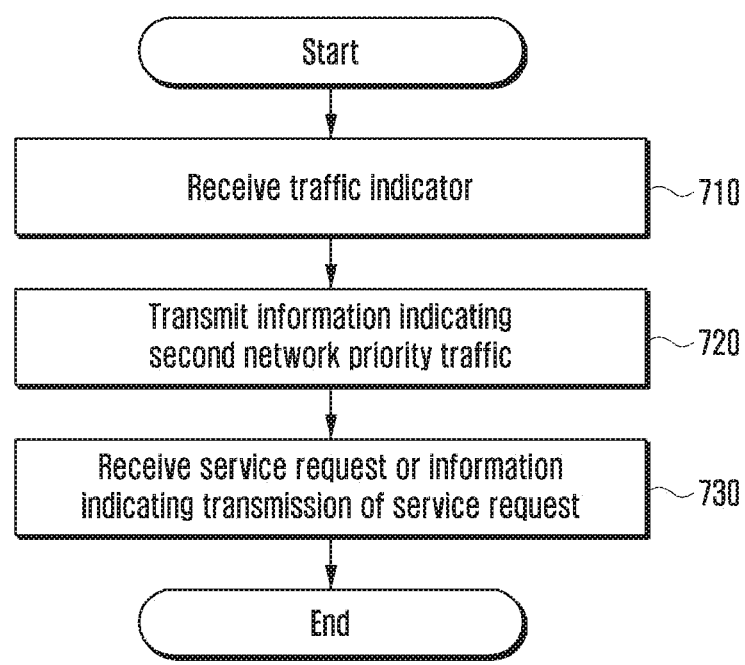
FIG. 7 illustrates operations of the first network core according to an embodiment of the disclosure.

FIG. 7 illustrates operations of the first network core according to an embodiment of the disclosure.

At operation 710, the first network core receives a traffic indicator from the second network core. The control plane entity of the first network core may receive a traffic indicator from the control plane entity of the second network core. The traffic indicator indicates whether the traffic destined for the terminal is second network priority traffic.

At operation 720, the first network core or the control plane entity thereof may transmit information indicating second network priority traffic to the terminal. This information may be transmitted via the base station of the first network. The second network priority traffic may be indicated in various ways. When the terminal is in the first network active mode, a second network priority traffic indicator may be transmitted. If the second network is a 5G network, the second network priority traffic indicator may be a 5G priority notification. When the terminal is in the first network idle mode, information indicating second network priority traffic may be transmitted together with a paging message. The paging message may include an indicator indicating second network priority traffic, and the paging purpose may indicate traffic reception through the second network.

At operation 730, the first network may receive a service request, or may receive information indicating that the terminal has sent a service request to the second network.

The first network may receive a service request when the terminal has failed to find a cell connectable to the second network as a result of neighbor cell search. In this case, as the terminal sends a service request to the first network instead of the second network, the first network core may receive the service request. Thereafter, the first network core can provide traffic to the terminal after authentication, security, and bearer setup procedures.

When the terminal sends a service request to the second network, the first network core may receive information indicating that the terminal has sent a service request to the second network core from the terminal or the second network core. The reason is as follows. The first network core, on behalf of the second network core, transmits a paging message or information indicating second network priority traffic to the terminal. Then, the terminal may transmit a service request to the second network core. Here, if the first network does not know that the terminal has sent a service request to the second network core, it may unnecessarily continue to transmit a paging message or information indicating second network priority traffic to the terminal. Upon receiving information indicating that the terminal has sent a service request to the second network core from the terminal or the second network core, the first network core can discontinue transmitting a paging message or the like to the terminal.

Meanwhile, the second network may be configured to repeat transmission of a paging message or second network priority traffic indication only for a preset number of times or a preset time. If a service request is not received from the terminal for the preset number of times or the preset time, or if a message indicating transmission of a service request to the second network is not received from the second network core or the terminal for the preset number of times or the preset time, the first network core may discontinue transmitting a paging message or second network priority traffic indication to the terminal.

Meanwhile, the operation method of the first network core is not limited to the embodiment of FIG. 7, and the first network core can perform all operations of the first network core described with reference to FIGS. 1 to 5.

Figure 8:
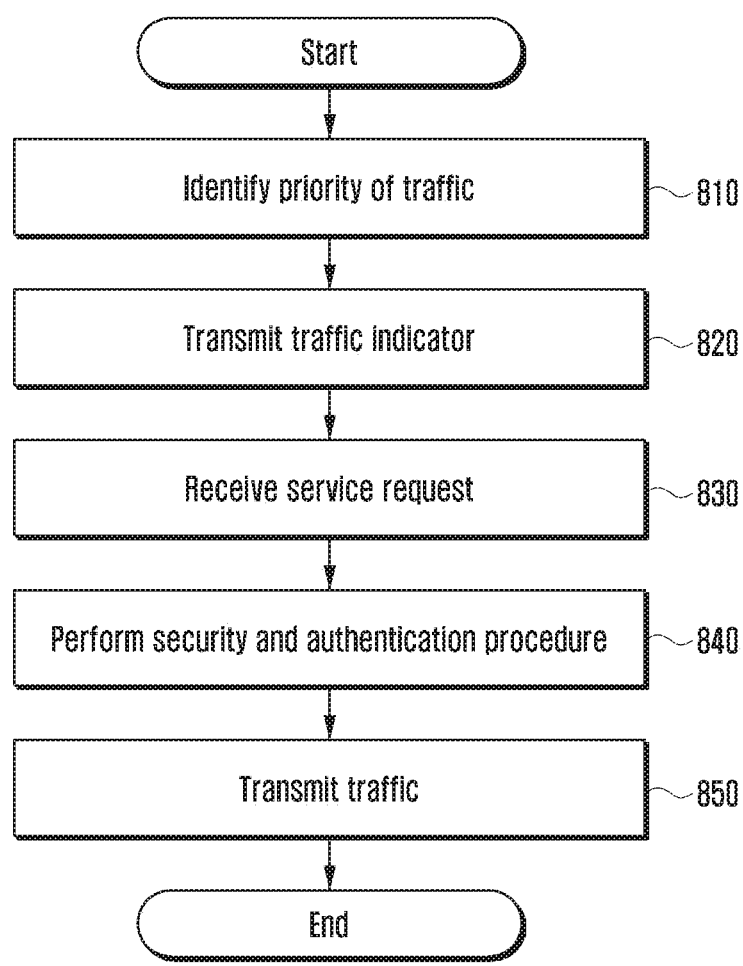
FIG. 8 illustrates operations of the second network core according to an embodiment of the disclosure.

FIG. 8 illustrates operations of the second network core according to an embodiment of the disclosure.

The second network core may receive traffic destined for the terminal. The user plane entity of the second network core may receive the traffic. At operation 810, the second network core can identify the priority of the traffic. The second network core may determine whether the traffic is second network priority traffic. The second network core may identify whether the traffic is second network priority traffic based on information included in the traffic or information received together with the traffic. If the traffic is not second network priority traffic, it can be regarded as first network priority traffic. Operation 810 may be performed by the user plane entity of the second network core. In the case of second network priority traffic, the user plane entity of the second network core may transmit a traffic indicator to the control plane entity of the second network core. The traffic indicator may indicate that the traffic is second network priority traffic. For example, this can be indicated in the following way. A traffic indicator may be transmitted to indicate whether the traffic is second network priority traffic. Information indicating second network priority traffic may be marked in the packet. Information indicating second network priority traffic may be marked in the null packet.

At operation 820, the second network core may transmit a traffic indicator to the first network core. The control plane entity of the second network core may transmit a traffic indicator to the control plane entity of the first network core. The traffic indicator transmitted to the first network core may be used by the first network core to transmit a second network priority traffic indication to the terminal.

At operation 830, the second network core may receive a service request from the terminal. The service request is received from the terminal when the terminal can access a cell of the second network as a result of a cell search. The service request is not received from the terminal when the terminal has failed to find a cell of the second network as a result of a cell search.

Upon receiving the service request from the terminal, the second network core may transmit information indicating that the service request has been received from the terminal to the first network core.

Upon reception of the service request from the terminal, at operation 840, the second network core performs a security and authentication procedure with the terminal. In addition, the second network core establishes a bearer for the terminal.

At operation 850, the second network core transmits the traffic to the terminal. The second network core can transmit the traffic by using the established bearer.

Meanwhile, the operation method of the second network core is not limited to the embodiment of FIG. 8, and the second network core can perform all operations of the second network core described with reference to FIGS. 1 to 5.

Figure 9:
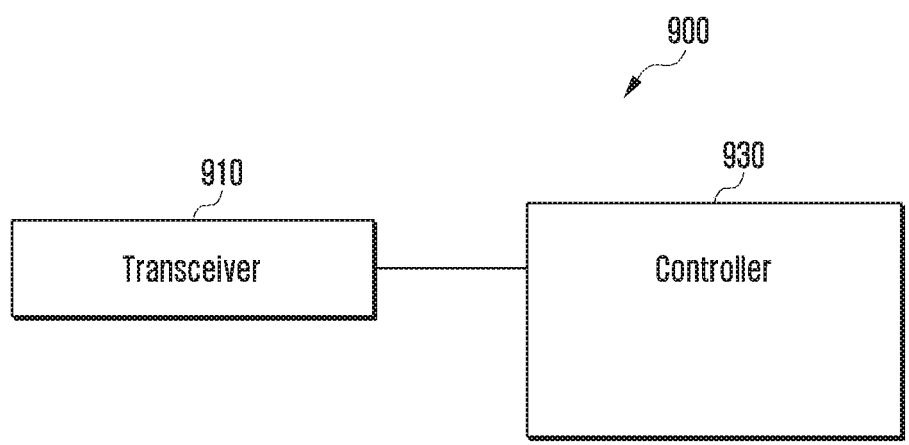
FIG. 9 is a block diagram of a terminal according to an embodiment of the disclosure.

FIG. 9 is a block diagram of a terminal according to an embodiment of the disclosure.

With reference to FIG. 9, the terminal 900 may include a transceiver 910 and a controller 930. The terminal 900 can transmit and receive signals, information, data, and traffic through the transceiver 910. The controller 930 may include at least one processor. The controller 930 can control the overall operation of the terminal. In addition, the controller 930 can control the operations of the terminal described with reference to FIGS. 1 to 6.

In one embodiment of the disclosure, the controller 930 may be configured to control receiving information indicating second network priority traffic from the first network core, searching for cells of the second network based on the information indicating second network priority traffic, and transmitting, if there is a cell connectable to the second network, a service request to the second network.

In one embodiment of the disclosure, the controller 930 may be configured to control transmitting a service request to the first network if there is no cell connectable to the second network.

In one embodiment of the disclosure, if the second network priority traffic is second network dedicated traffic, the controller 930 may be configured to control preventing transmission of a service request to the first network even if there is no cell connectable to the second network.

In one embodiment of the disclosure, if the service request is transmitted to the second network, the controller 930 may be configured to control transmitting information indicating that the service request has been transmitted to the second network to the first network.

In one embodiment of the disclosure, when the terminal is in the first network assisted idle mode, the controller 930 may be configured to control receiving the information indicating second network priority traffic contained in a paging message or receiving the information indicating second network priority traffic after the terminal is switched to the active mode through a paging message. Additionally, when the terminal is in the first network assisted idle mode, the controller 930 may be configured to control receiving a paging message for the terminal only through the first network instead of the second network, and control the terminal not to perform the tracking area update (TAU) procedure for the second network.

Meanwhile, the configuration and operation of the terminal are not limited to the embodiment described in FIG. 9, and the terminal can perform the operations of the terminal described in the embodiments of FIGS. 1 to 6.

Figure 10:
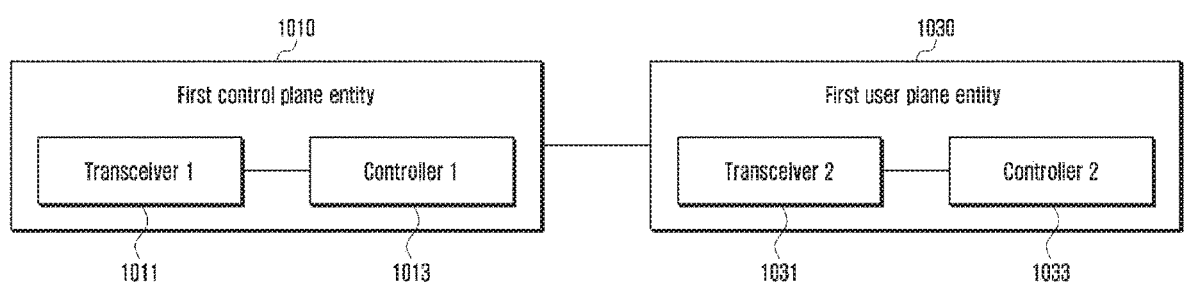
FIG. 10 is a block diagram of a first network core according to an embodiment of the disclosure.

FIG. 10 is a block diagram of a first network core according to an embodiment of the disclosure.

With reference to FIG. 10, the first network core may include a first control plane entity 1010 and a first user plane entity 1030. The first control plane entity 1010 may include a transceiver-1 1011 to transmit and receive signals, data, information, messages and traffic, and a controller-1 1013 to control the overall operation of the first control plane entity 1010. The first user plane entity 1030 may include a transceiver-2 1031 to transmit and receive signals, data, information, messages and traffic, and a controller-2 1033 to control the overall operation of the first user plane entity 1030. The first control plane entity 1010 and the first user plane entity 1030 may be implemented as a single entity without being limited to the configuration of FIG. 10.

The controller-1 1013 of the first control plane entity 1010 and the controller-2 1033 of the first user plane entity 1030 may be collectively referred to as the controller of the first network core. The controller of the first network core may control the operation of the first control plane entity 1010 and the operation of the first user plane entity 1030, and may control the overall operation of the first network core including the first control plane entity 1010 and the first user plane entity 1030.

In one embodiment of the disclosure, the controller of the first network core may be configured to control receiving a traffic indicator indicating presence of second network priority traffic from the second network core, transmitting information indicating second network priority traffic to the terminal, and receiving a service request or information indicating that the terminal has transmitted a service request to the second network according to the cell search result of the terminal.

If the terminal is in the first network assisted idle mode, the controller of the first network core may be configured to control transmitting a paging message including the information indicating second network priority traffic to the terminal, or transmitting the information indicating second network priority traffic to the terminal after switching the terminal to the active mode through a paging message.

Upon receiving information indicating that the terminal has transmitted a service request to the second network, the controller of the first network core may be configured to control terminating transmission of the information indicating second network priority traffic to the terminal.

Meanwhile, the configuration and operation of the first network core are not limited to the embodiment described in FIG. 10, and the first network core can perform the operations of the first network core described in the embodiments of FIGS. 1 to 5.

Figure 11:
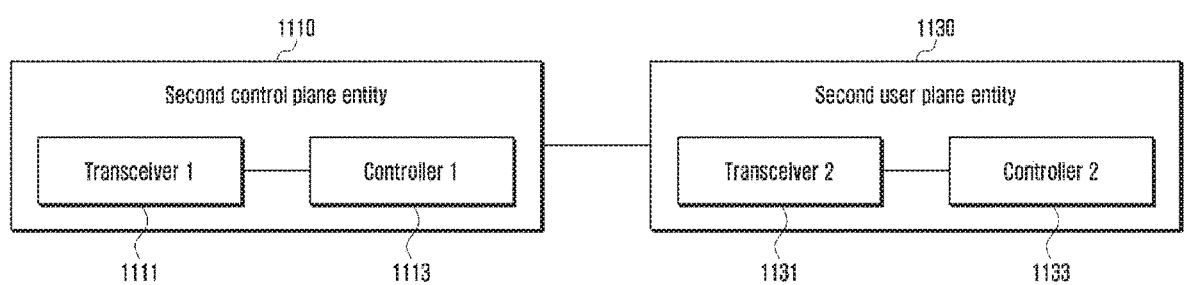
FIG. 11 is a block diagram of a second network core according to an embodiment of the disclosure.

FIG. 11 is a block diagram of a second network core according to an embodiment of the disclosure.

With reference to FIG. 11, the second network core may include a second control plane entity 1110 and a second user plane entity 1130. The second control plane entity 1110 may include a transceiver-1 1111 to transmit and receive signals, data, information, messages and traffic, and a controller-1 1113 to control the overall operation of the second control plane entity 1110. The second user plane entity 1130 may include a transceiver-2 1131 to transmit and receive signals, data, information, messages and traffic, and a controller-2 1133 to control the overall operation of the second user plane entity 1130. The second control plane entity 1110 and the second user plane entity 1130 may be implemented as a single entity without being limited to the configuration of FIG. 11.

The controller-1 1113 of the second control plane entity 1110 and the controller-2 1133 of the second user plane entity 1130 may be collectively referred to as the controller of the second network core. The controller of the second network core may control the operation of the second control plane entity 1110 and the operation of the second user plane entity 1130, and may control the overall operation of the second network core including the second control plane entity 1110 and the second user plane entity 1130.

In one embodiment of the disclosure, the controller of the second network core may be configured to control determining whether the traffic destined for the terminal is second network priority traffic, transmitting a traffic indicator indicating that the traffic destined for the terminal is second network priority traffic to the first network core based on a determination that the traffic destined for the terminal is second network priority traffic, and receiving a service request from the terminal through the second network.

The controller of the second network core may be configured to control transmitting the traffic indicator to the control plane entity of the first network, or transmitting the second network priority traffic destined for the terminal marked with the traffic indicator or a null packet marked with the traffic indicator to the user plane entity of the first network.

Upon receiving the service request, the controller of the second network core may be configured to control transmitting information indicating reception of the service request to the first network core.

The controller of the second network core may be configured to control deleting the context of the terminal based on the TAU information of the terminal received through the first network, or deleting the context of the terminal based on a determination that traffic for the terminal is not generated for a preset time.

Meanwhile, the configuration and operation of the second network core are not limited to the embodiment described in FIG. 11, and the second network core can perform the operations of the second network core described in the embodiments of FIGS. 1 to 5.

Figure 12:
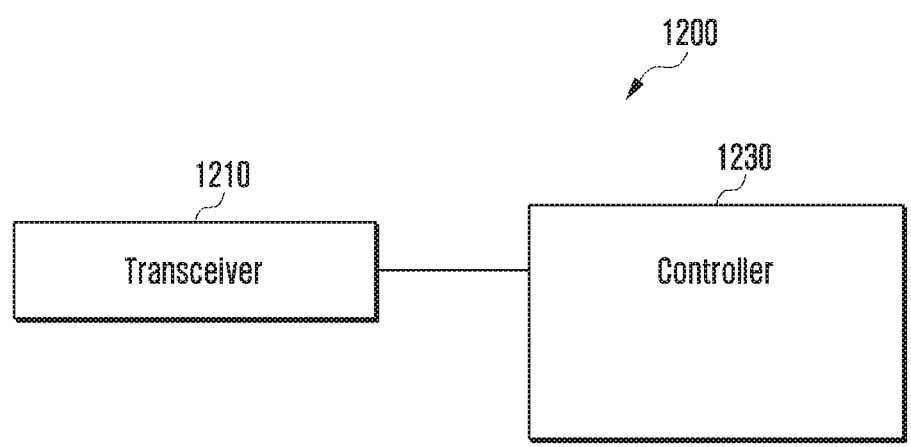
FIG. 12 is a block diagram of a base station according to an embodiment of the disclosure.

FIG. 12 is a block diagram of a base station according to an embodiment of the disclosure.

With reference to FIG. 12, the base station 1200 may include a transceiver 1210 and a controller 1230. The base station 1200 can transmit and receive signals, information, data, and traffic through the transceiver 1210. The controller 1230 may include at least one processor. The controller 1230 can control the overall operation of the base station. In addition, the controller 1230 can control the operations of the base station described with reference to FIGS. 1 to 5.

In one embodiment of the disclosure, if the base station is a base station of the first network, the controller 1230 may transfer signals, information, traffic, data, or the like between the terminal and the first network core. If the base station is a base station of the second network, the controller 1230 may transfer signals, information, traffic, data, or the like between the terminal and the second network core.

Meanwhile, the configuration and operation of the base station are not limited to the embodiment described in FIG. 12, and the base station can perform the operations of the base station described in the embodiments of FIGS. 1 to 5.

Hereinabove, various embodiments of the disclosure have been shown and described for the purpose of illustration without limiting the subject matter of the disclosure. It should be understood by those skilled in the art that many variations and modifications of the method and apparatus described herein will still fall within the spirit and scope of the disclosure as defined in the appended claims and their equivalents.

The invention claimed is:

1. A method for a terminal to request a service, the method comprising:
   receiving information indicating second network priority traffic from a first network core;
   searching for a cell of a second network based on the information indicating second network priority traffic; and
   transmitting a service request to the second network in case that there is a cell connectable to the second network,
   wherein the second network priority traffic is second network dedicated traffic or traffic whose transmission through the second network takes priority over transmission through the first network.

2. A method for a first network core to provide a service, the method comprising:
   receiving a traffic indicator indicating that there is second network priority traffic from a second network core;
   transmitting information indicating second network priority traffic to a terminal; and
   receiving a service request or information indicating that the terminal has transmitted a service request to the second network according to a cell search result of the terminal,
   wherein the second network priority traffic is second network dedicated traffic or traffic whose transmission through the second network takes priority over transmission through the first network.

3. A method for a second network core to provide a service, the method comprising:
   determining whether traffic destined for a terminal is second network priority traffic;
   transmitting a traffic indicator indicating that the traffic destined for the terminal is the second network priority traffic to a first network core, in case that the traffic destined for the terminal is the second network priority traffic; and
   receiving a service request from the terminal through the second network,
   wherein the second network priority traffic is second network dedicated traffic or traffic whose transmission through the second network takes priority over transmission through the first network.

4. A terminal comprising:
   a transceiver configured to transmit and receive signals; and
   a controller configured to control receiving information indicating second network priority traffic from a first network core, searching for a cell of a second network based on the information indicating second network priority traffic, and transmitting a service request to the second network, in case that there is a cell connectable to the second network,
   wherein the second network priority traffic is second network dedicated traffic or traffic whose transmission through the second network takes priority over transmission through the first network.

5. The terminal of claim 4, wherein the controller is configured to control transmitting a service request to the first network, in case that there is no cell connectable to the second network.

6. The terminal of claim 5, wherein in case that the second network priority traffic is second network dedicated traffic, the controller is configured to control preventing transmission of a service request to the first network although there is no cell connectable to the second network.

7. The terminal of claim 4, wherein in case that the service request is transmitted to the second network, the controller is configured to control transmitting information indicating that the service request has been transmitted to the second network to the first network.

8. The terminal of claim 4,
   wherein when the terminal is in a first network assisted idle mode, the information indicating second network priority traffic is received as a part of a paging message or is received after the terminal is switched to active mode through a paging message, and
   wherein a paging message for the terminal is received only through the first network instead of the second network and the terminal does not perform a tracking area update (TAU) procedure for the second network.

9. A first network core comprising:
   a transceiver configured to transmit and receive signals; and
   a controller configured to control receiving a traffic indicator indicating that there is second network priority traffic from a second network core, transmitting information indicating second network priority traffic to a terminal, and receiving a service request or information indicating that the terminal has transmitted a service request to the second network according to a cell search result of the terminal,
   wherein the second network priority traffic is second network dedicated traffic or traffic whose transmission through the second network takes priority over transmission through the first network.

10. The first network core of claim 9, wherein when the terminal is in a first network assisted idle mode, the information indicating second network priority traffic is transmitted as a part of a paging message to the terminal or is transmitted to the terminal after the terminal is switched to active mode through a paging message.

11. The first network core of claim 9, wherein the controller is configured to control terminating transmission of the information indicating second network priority traffic to the terminal upon receiving information indicating that the terminal has transmitted a service request to the second network.

12. A second network core comprising:
   a transceiver configured to transmit and receive signals; and
   a controller configured to control determining whether traffic destined for a terminal is second network priority traffic, transmitting a traffic indicator indicating that the traffic destined for the terminal is the second network priority traffic to a first network core, in case that the traffic destined for the terminal is the second network priority traffic, and receiving a service request from the terminal through the second network,
   wherein the second network priority traffic is second network dedicated traffic or traffic whose transmission through the second network takes priority over transmission through the first network.

13. The second network core of claim 12, wherein the controller is configured to control transmitting the traffic indicator to a control plane entity of the first network, or transmitting the second network priority traffic destined for the terminal marked with the traffic indicator or a null packet marked with the traffic indicator to the user plane entity of the first network.

14. The second network core of claim 12, wherein the controller is configured to control transmitting information indicating reception of the service request to the first network core after receiving the service request.

15. The second network core of claim 12, wherein the controller is configured to control deleting the context of the terminal based on TAU information of the terminal received through the first network, or deleting the context of the terminal, in case that traffic for the terminal has not occurred for a preset time.

\* \* \* \* \*